UNITED STATES PATENT OFFICE 2,479,480

FATTY ACID CONDENSATION PRODUCTS OF WATER-SOLUBLE THERMOPLASTIC AMINE RESINS

James R. Dudley, Cos Cob, Conn., assignor to American Cyanamid Company, New York, N. Y., a corporation of Maine No Drawing. Application April 18, 1946, Serial No. 663,234

5 Claims. (Cl. 260—2)

This invention relates to surface active materials and more particularly, to resinous cationic surface active materials.

In the past, epoxy compounds of the type of epichlorohydrin have been condensed with polyamines to form water-soluble products.

It is an object of the present invention to acylate with a fatty acid the condensation product of an alpha-chloro-beta,gamma-epoxy organic compound such as epichlorhydrin with an alkylene polyamine.

It is another object of the present invention to prepare new resinous surface active materials.

Still another object of the present invention is to produce resinous cationic surface active materials by treating a water-soluble, thermoplastic amine resin with a fatty acid having at least four carbon atoms.

The invention will be described in greater detail in conjunction with the following specific examples in which the proportions are given in parts by weight unless otherwise indicated. It should be understood that the examples are merely illustrative, and it is not intended to limit the scope of the invention to the details therein set forth.

EXAMPLE 1

| | Parts |
|---|---|
| Epichlorohydrin - tetraethylenepentamine polymer solution (1 mol) | 481.5 |
| Stearic acid (1 mol) | 284.5 |

The aqueous solution of the epichlorohydrin-tetraethylenepentamine polymer prepared as described below and the stearic acid are charged into a three-necked vessel equipped with a mechanical stirrer, a thermometer, and a water trap surmounted by a reflux condenser. The trap is so designed that the condensate from the reflux condenser drops through a water-cooled spiral, while the bottom of the trap terminates in a ground glass joint to which a graduated vessel of appropriate size is attached.

An amount of xylene equal to about twice the quantity of water to be removed is added to the reaction mixture through the top of the trap so that the receiver and the trap are first filled and the remainder overflows into the reaction mixture. The vessel containing the reactants and the xylene is heated so that brisk refluxing is maintained. Refluxing is continued for about 1¼ hours at 96°–133° C. until no more water is collected. The trap is then removed, and the apparatus is arranged for distillation.

A portion of the xylene is removed by distillation at atmospheric pressure for about ¾ of an hour at 133°–150° C., after which pressure is reduced to 12 mm. during a ½ hour heating period at from 150°–165° C. In order to insure complete removal of the xylene, the product is then heated for an hour at 165°–170° C. under a pressure of 12 mm.

139 parts of the amide are obtained. The compound is a hard, brittle, light tan colored wax. It may be ground to a light yellow colored powder, it fuses to an opaque melt at 65°–70° C., it is dispersible in hot water and in cold dilute acetic acid, and it is soluble in hot dilute acetic acid.

EXAMPLE 2

| | Parts |
|---|---|
| Epichlorohydrin - tetraethylenepentamine polymer solution (1 mol) | 481.5 |
| Stearic acid (1 mol) | 284.5 |

The epichlorohydrin - tetraethylenepentamine polymer in aqueous solution and the stearic acid are charged into the vessel described in Example 1. Kerosene having a boiling range of from 188°–225° C. is added instead of xylene, and the reaction mixture is refluxed for about 6¼ hours at 104°–195° C. Part of the kerosene is then removed by distillation for 1¼ hours under a pressure of 5 mm. and a temperature of 125°–153° C., after which additional heating for an hour at 149°–153° C. under 5 mm. pressure is provided.

164 parts of a product having identical properties with those listed above for the product of Example 1 are obtained.

EXAMPLE 3

| | Parts |
|---|---|
| Epichlorohydrin - tetraethylenepentamine polymer solution (1.33 mols) | 640.4 |
| Stearic acid (1 mol) | 284.5 |

The procedure of Example 1 is followed with the following heating periods:

(a) Azeotropic treatment for about 3 hours at from 96°–138° C.

(b) Solvent removal at atmospheric pressure and 138°–143° C. for ¾ of an hour.

(c) Solvent removal at a pressure of 14 mm. for 1½ hours at 143°–165° C.

(d) Final heat treatment for an hour at from 12-16 mm. pressure and a temperature of 165° C.

144 parts of an amide product are obtained which has identical properties with those listed for the amides of Examples 1 and 2 except that it is yellow rather than tan colored.

EXAMPLE 4

| | Parts |
|---|---|
| Epichlorohydrin - tetraethylenepentamine polymer solution (1 mol) | 481.5 |
| Stearic acid (0.5 mol) | 142.2 |

The procedure of Example 1 is followed with the following heating periods:

(a) Azeotropic treatment for about 3½ hours at a temperature of from 96°–139° C.

(b) Solvent removal at atmospheric pressure and from about 139°–158° C. for about 1½ hours.

(c) Solvent removal under a pressure of 20 mm. and a temperature of from 58°–166° C. for an hour.

(d) Final heat treatment for an hour under a pressure of 20 mm. and a temperature of 163°–166° C.

61.5 parts of reaction product are obtained. The product is a hard, brittle, yellow colored wax which may be ground to a light yellow colored powder and which fuses to an opaque melt at 60°–65° C. It is dispersible in cold water, somewhat soluble in cold dilute acetic acid, and soluble in hot dilute acetic acid.

EXAMPLE 5

| | Parts |
|---|---|
| Epichlorohydrin - tetraethylenepentamine polymer solution (1 mol) | 481.5 |
| Stearic acid (0.2 mol) | 56.9 |

The procedure of Example 1 is followed with the following heating periods:

(a) Azeotropic treatment for about 3¼ hours at 96°–136° C.

(b) Solvent removal at atmospheric pressure for about one-half hour at 136°–148° C.

(c) Solvent removal under a pressure of 12 mm. for about ¾ of an hour at 148°–165° C.

(d) Final heat treatment for an hour under a pressure of 12 mm. and a temperature of 165° C.

26.8 parts of a brittle, hygroscopic, yellow colored wax having a fusion temperature greater than 70° C. are obtained. The product is dispersible in cold water, soluble in hot water, and soluble in cold dilute acetic acid.

EXAMPLE 6

| | Parts |
|---|---|
| Epichlorohydrin - tetraethylenepentamine Polymer solution (0.5 mol) | 240.8 |
| Lauric acid (1 mol) | 200.3 |

The aqueous solution of the epichlorohydrin-tetraethylenepentamine polymer is charged into a reaction vessel such as described in Example 1 and xylene is added thereto. The mixture of polymer and solvent is heated at 134°–139° C. for about 68 hours to remove water by azeotropic distillation. The lauric acid is then added to the reaction mixture in the vessel and it is heated for about 6 hours at 120°–149° C. under a pressure of 11 mm. The final traces of solvent are then removed by heating for about 15 minutes at 149°–154° C. under a pressure of from 7–11 mm.

641 parts of a gummy, tacky, tan colored solid are obtained. It is dispersible in hot water and in cold dilute acetic acid and is soluble in hot dilute acetic acid.

EXAMPLE 7

| | Parts |
|---|---|
| Epichlorohydrin - tetraethylenepentamine polymer solution (1 mol) | 481.5 |
| Lauric acid (1 mol) | 200.3 |

The procedure of Example 1 is followed with the following heating periods:

(a) Azeotropic treatment for about 4 hours at 94°–136° C.

(b) Solvent removal at atmospheric pressure for about ¼ of an hour at 136°–145° C.

(c) Solvent removal under a pressure of 15 mm. for about ½ hour at 145° C.

(d) Heat treatment for an hour under a pressure of 15 mm. and a temperature of 145°–150° C.

163 parts of a water-soluble, gummy, tacky, yellow colored solid are obtained.

EXAMPLE 8

| | Parts |
|---|---|
| Epichlorohydrin - tetraethylenepentamine polymer solution (1 mol) | 481.5 |
| Lauric acid (0.5 mol) | 100.2 |

The procedure of Example 1 is followed with the following heating periods:

(a) Azeotropic treatment for about 2½ hours at from 95°–134° C.

(b) Solvent removal at atmospheric pressure for ½ hour at 134°–140° C.

(c) Solvent removal under a pressure of 11 mm. for ½ hour at from 140°–150° C.

(d) Final heat treatment at about 150° C. and 11 mm. pressure for an hour.

73.5 parts of a readily water-soluble, gummy, tacky, yellow colored solid are obtained.

EXAMPLE 9

| | Parts |
|---|---|
| Epichlorohydrin - tetraethylenepentamine polymer solution (1 mol) | 481.5 |
| Lauric acid (0.5 mol) | 100.2 |

The procedure of Example 1 is followed except that V. M. P. naphtha is used in place of xylene as a solvent. The following heating periods are observed.

(a) Azeotropic treatment for about 2 hours at 87°–113° C.

(b) Solvent removal at atmospheric pressure for about 4 hours at 113°–217° C.

(c) Solvent removal under a pressure of 50 mm. for about ½ hour at 216°–217° C.

(d) Heat treatment for an hour at 216°–218° C. and 50 mm. pressure.

70.5 parts of a readily water-soluble gummy, tacky, yellow colored solid are obtained.

EXAMPLE 10

| | Parts |
|---|---|
| Epichlorohydrin - tetraethylenepentamine polymer solution (5 mols) | 2408 |
| Lauric acid (1 mol) | 200.3 |

The procedure of Example 1 is followed with the following heat treatments:

(a) Azeotropic treatment for about 4¼ hours at 96°–134° C.

(b) Solvent removal at atmospheric pressure for about ¼ of an hour at 134°–139° C.

(c) Solvent removal under a pressure of 15 mm. for about ¾ of an hour at a temperature of 139°–150° C.

(d) Heat treatment for an hour at about 150° C. and from 16–32 mm. pressure.

142 parts of a readily water-soluble, brittle, tacky, yellow colored solid are obtained.

EXAMPLE 11

| | Parts |
|---|---|
| Epichlorohydrin - tetraethylenepentamine polymer solution (1 mol) | 481.5 |
| 2-ethylhexanoic acid (1 mol) | 144 |

The procedure of Example 1 is followed with the following heating periods:

(a) Azeotropic treatment for about 6 hours at 97°–139° C.

(b) Solvent removal at atmospheric pressure for about ¼ of an hour at 139°–146° C.

(c) Solvent removal for about an hour at 28 mm. pressure and 144°–146° C.

(d) Heating at 144°–145° C. under a pressure of 28 mm. for an hour.

164 parts of a water-soluble, transparent, light red colored solid are obtained.

EXAMPLE 12

| | Parts |
|---|---|
| Epichlorohydrin - tetraethylenepentamine polymer solution (2 mols) | 963 |
| 2-ethylhexanoic acid (1 mol) | 144 |

The procedure of Example 1 is followed with the following heat treatment:

(a) Azeotropic treatment for about 13¼ hours at 98°–140° C.

(b) Solvent removal at atmospheric pressure for about 3½ hours at 140°–205° C.

(c) Solvent removal for ½ hour at a pressure of 47 mm. and a temperature of 205°–209° C.

(d) Heating for an hour at 47 mm. pressure and a temperature of 209°–212° C.

149 parts of a water-soluble, brittle, transparent, light red colored solid are obtained.

EXAMPLE 13

| | Parts |
|---|---|
| Epichlorohydrin - tetraethylenepentamine polymer solution (1 mol) | 481.5 |
| Butyric acid (1 mol) | 88.1 |

The procedure of Example 1 is followed with the following heating ranges:

(a) Azeotropic treatment for about 6 hours at 99°–135° C.

(b) Solvent removal under atmospheric pressure for about ½ hour at 135°–140° C.

(c) Solvent removal under a pressure of 30 mm. and a temperature of 140°–145° C. for ½ hour.

(d) Heat treatment for about an hour at 144°–145° C. and 26–30 mm. pressure.

139 parts of a readily water-soluble, brittle, tacky, transparent, orange colored solid are obtained.

In all of the above examples when a pressure less than atmospheric is mentioned, the pressure was reduced during the distillation while the temperature was being raised. In other words, the entire heating was not carried out at the particular pressure quoted but at pressures gradually decreasing to that limit.

Preparation of epichlorohydrin-tetraethylenepentamine polymer solution

| | Parts |
|---|---|
| Tetraethylenepentamine (9.0 mols) | 1701 |
| Epichlorohydrin (9.0 mols) | 832.5 |
| Water | 1800 |

The tetraethylenepentamine is dissolved in the water in a suitable vessel with stirring. Heat is liberated, and the solution is cooled to 20° C. The epichlorohydrin is slowly added to this cooled solution over a period of 1½ hours, during which time the raction vessel is intermittently cooled in order to prevent the temperature from rising above 30° C. After the addition is complete, the reaction mixture is allowed to heat spontaneously and the temperature rises to a maximum of about 49° C. at the end of 2 hours. After an additional 1½ hours the temperature falls to 43° C., and the solution is then heated with steam for 4 hours at 95°–96° C. Upon cooling, the product is a light red colored, clear, viscous syrup weighing 4334 parts. 481.5 parts of this aqueous solution of the polymer contains 281.5 parts of solids and corresponds to one unit weight of the resin, based on one mole of tetraethylenepentamine.

Other polyalkylene polyamines may be substituted for part or all of the tetraethylenepentamine used in the examples. Furthermore, mixtures of two, three, four, seven or any other number of polyamines may be employed.

Examples of suitable polyamines include ethylene diamine, 1,3-diaminopropane, 1,4-diamino-n-butane, 1,3-diamino-n-butane, 1,5-diamino-n-pentane, 1,6-diamino-n-hexane, 1,10-diamino-n-decane, 1,6-diamino-3-methyl-n-hexane, 3,3'-diamino dipropyl ether and other similar diamines containing hetero atoms in the chains separating the amino groups, diethylene triamine, triethylene tetramine, pentaethylene hexamine and all of the higher homologs thereof containing additional —CH$_2$CH$_2$NH— groups in the chain between the primary amino groups, etc. Complex mixtures of polyethylene polyamines of high molecular weight obtained by the addition of large numbers of molecules of ammonia to ethylene dibromide or ethylene dichloride and the like may be used.

Instead of epichlorohydrin, other substances having an alpha-chloro-beta,gamma-epoxy arrangement are suitable for reaction with polyamines and fatty acids in accordance with this invention. Among these, some examples are compounds of the following general formula:

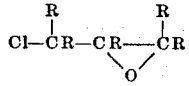

where R is an organic radical or hydrogen. Preferably, neither R contains any strong acidic group such as a sulfonic acid group, but any organic radicals may be used since the R groups are not important. It is important that the chloro and epoxy groups be in the positions indicated. The R groups may, for example, be CH$_3$—, C$_2$H$_5$—, C$_3$H$_7$—, C$_5$H$_{11}$—, C$_8$H$_{17}$—, C$_{10}$H$_{21}$—, phenyl, benzyl, tolyl, xylyl, pyridyl, furyl, etc.

Among these some examples are:

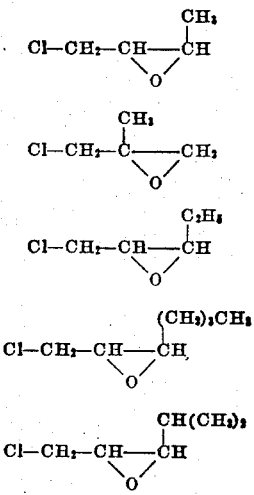

$$Cl-CH_2-CH\underset{\underset{O}{\diagdown\diagup}}{-}CH-\overset{(CH_2)_nCH_3}{|}$$

$$\underset{CH_3}{\overset{|}{Cl-CH-CH\underset{\underset{O}{\diagdown\diagup}}{-}CH_2}}$$

It is essential that the molar ratio of the alpha-chloro-beta, gamma-epoxy organic compound to the polyamine be 1:1. If a greater amount of epichlorohydrin type compound is used, an insoluble resin results. A 1:1 molar ratio of epichlorohydrin-polyamine polymer to fatty acid also may be used to advantage, although an excess of the polymer over the fatty acid may be used too, i. e., up to about 5:1. Even greater excesses of polymer are operable, but they give no practical purpose in the preparation of the surface active products of the present invention. Preponderating quantities of fatty acids, i. e., a molar ratio of 1:2, decrease the rate of reaction to such an extent that the process is of little practical, commercial interest because of the length of the heating period required.

The invention is not limited to the use of any particular organic solvent for azeotropic removal of the water produced in the reaction as well as of the water introduced with the polymer solution, and any suitable organic solvent may be used. Examples of these include high-boiling ethers such as amisole, phenetole, etc., and hydrocarbons including, for example, mesitylene, cumene, o-, m-, and p-cymenes, etc., as well as the xylene, kerosene, and naphtha of the specific examples. A solvent is suitable if its boiling point is sufficiently high so that the reaction can be completed in a reasonable length of time and yet low enough to permit ready removal from the product under reduced pressure.

Use of a water-immiscible organic solvent as the reaction medium overcomes two difficulties which are met in the reaction between the epichlorohydrin-tetraethylenepentamine polymer and a fatty acid. In the first place, when these reactants are brought together in aqueous medium and heated to expel the water, excessive frothing occurs. In the second place, the products are highly colored when such a reaction is carried out in the presence of air, and an atmosphere of hydrogen or nitrogen need frequently be used. Not only is air excluded by the vapors of a water-immiscible organic solvent, but the water is removed without frothing by azeotropic distillation.

The fatty acid employed for acylation of the epichlorohydrin-polyamine reaction product should contain at least four carbon atoms in order to impart surface activity to the resulting amides. I prefer to use fatty acids of from four to eighteen carbon atoms, but the invention is not restricted to this upper limit.

While I do not wish to be limited to any particular theory of mechanism of the formation of the water-soluble resin from epichlorohydrin and tetraethylenepentamine or of the reaction of this water-soluble amine resin with a fatty acid, I believe that the following reactions take place.

Since the condensation of epichlorohydrin with secondary amines has been studied and it has been found that the first product of the reaction is an unstable chlorohydroxy propylamine which, when treated with caustic alkali, produces an epoxypropylamine according to the equations $$Cl-CH_2-CH\underset{\underset{O}{\diagdown\diagup}}{-}CH_2 + H-N\underset{R}{\overset{R}{\diagdown\diagup}} \longrightarrow$$

$$Cl-CH_2-\underset{\underset{OH}{|}}{CH}-CH_2-N\underset{R}{\overset{R}{\diagdown\diagup}}$$

$$Cl-CH_2-\underset{\underset{OH}{|}}{CH}-CH_2-N\underset{R}{\overset{R}{\diagdown\diagup}} + NaOH \longrightarrow$$

$$CH_2\underset{\underset{O}{\diagdown\diagup}}{-}CH-CH_2-N\underset{R}{\overset{R}{\diagdown\diagup}} + NaCl$$

it seems likely that the initial exothermic reaction of the epichlorohydrin with the tetraethylenepentamine produces a chlorohydroxypropyl derivative of the amine:

$$H-(HN-C_2H_4-)_4-NH_2 + CH_2\underset{\underset{O}{\diagdown\diagup}}{-}CH-CH_2Cl \longrightarrow$$

$$H-(HN-C_2H_4-)_4-NH-CH_2-\underset{\underset{OH}{|}}{CH}-CH_2Cl$$

Then, because of the high basic character of the molecules, the elements of hydrochloric acid are removed with the formation of an epoxypropyl derivative $$H-(HN-C_2H_4-)_4-NH-CH_2-\underset{\underset{OH}{|}}{CH}-CH_2Cl \longrightarrow$$

$$H-(-HN-C_2H_4-)_4-NH-CH_2-CH\underset{\underset{O}{\diagdown\diagup}}{-}CH_2$$
$$.HCl$$

and self-alkylation occurs with resin formation $$\left(-(HN-C_2H_4-)_4-NH-CH_2-\underset{\underset{OH}{|}}{CH}-CH_2-\right)_x$$
$$.HCl$$

When the polymer is treated with fatty acid, only part of the amine groups of the polymer are amidified so that some remain to impart hydrophilic and cationic properties to the products. The reaction may be pictured in the following manner:

$$\left(-CH_2-\underset{\underset{OH}{|}}{CH}-CH_2-(NHC_2H_4-)_4-NH-\right)_x xHCl + xRCOOH \longrightarrow$$

$$\left(-CH_2-CH-CH_2-NH-C_2H_4-NH-C_2H_4-\underset{\underset{\underset{R}{|}}{\underset{C=O}{|}}}{N}-C_2H_4-NH-C_2H_4-NH-\right)_x xHCl + xH_2O$$

There is no assurance, of course, that the acyl groups are evenly distributed on the polymer, and the above representation is shown only to typify the reaction involved and the probable structure of the products.

The products of the present invention range from hard brittle waxes to gummy tacky solids, depending upon the nature and the number of acyl groups introduced. In general, the products derived from the higher members of the fatty acid series are waxy, and those derived from the lower members are gummy and tacky. Varying the quantity of any particular fatty acid seems to have little effect upon the physical character of the products, but it does have an effect upon the insolubility and surface activity. In general, the materials are slightly basic in character and neutralization with acetic acid gives rise to higher solubility in water.

It is an advantage of the present invention that the products are very useful due to their surface activity. They may be used as wetting agents, for example, in which application the lauroyl derivative of the epichlorohydrin-tetraethylenepentamine polymer is particularly effective. Due to their cationic activity the amides of the present invention make excellent detergents, and they are also widely useful as emulsifying agents. The stearoyl derivative, for example, is an excellent emulsifying agent under alkaline, acid, or neutral conditions.

In the dye field the compounds of the present invention find wide application, for example, as wool dyeing assistants and in the flocculation of pigments. They may also be used to advantage as textile softeners.

I claim:
1. A resinous cationic surface active material obtained by condensing in a molar ratio of 1:1 to 1:5, respectively, a saturated fatty acid containing at least four carbon atoms with a water-soluble thermoplastic amine resin, said resin being a condensation product of equimolar proportions of epichlorohydrin and tetraethylenepentamine.

2. A resinous cationic surface active material obtained by condensing in a molar ratio of 1:1 to 1:5, respectively, lauric acid with a water-soluble thermoplastic amine resin, said resin being a condensation product of equimolar proportions of epichlorohydrin and tetraethylenepentamine.

3. A resinous cationic surface active material obtained by condensing in a molar ratio of 1:1 to 1:5, respectively, stearic acid with a water-soluble thermoplastic amine resin, said resin being a condensation product of equimolar proportions of epichlorohydrin and tetraethylenepentamine.

4. The method of preparing a resinous cationic surface active material which comprises condensing in a molar ratio of 1:1 to 1:5, respectively, a saturated fatty acid containing at least four carbon atoms with a water-soluble, thermoplastic amine resin, said resin being a condensation product of equimolar proportions of epichlorohydrin and tetraethylenepentamine.

5. The method of preparing a resinous cationic surface active material which comprises adding an organic solvent to a saturated fatty acid containing at least four carbon atoms and an aqueous solution of a thermoplastic amine resin, said resin being a condensation product of equimolar proportions of epichlorohydrin and tetraethylenepentamine and the molar ratio of fatty acid to amine resin being from 1:1 to 1:5, heating the resulting mixture, removing water of the aqueous resin solution and water formed in the reaction by azeotropic distillation, and removing the organic solvent by distillation.

JAMES R. DUDLEY.

REFERENCES CITED

The following references are of record in the file of this patent:

FOREIGN PATENTS

| Number | Country | Date |
| --- | --- | --- |
| 466,344 | Great Britain | May 24, 1937 |
| 651,797 | Germany | Oct. 20, 1937 |
| 654,840 | Germany | Dec. 31, 1937 |
| 849,348 | France | Aug. 11, 1939 |